(12) United States Patent
Piraner et al.

(10) Patent No.: US 7,431,508 B2
(45) Date of Patent: Oct. 7, 2008

(54) BEARING ASSEMBLY WITH PIN HAVING COMPOSITE CIRCULAR OUTER PROFILE

(75) Inventors: Ilya L. Piraner, Columbus, IN (US); Vladimir M. Fridman, Los Angeles, CA (US); Carl F. Musolff, Nashville, IN (US)

(73) Assignee: Cummins Intellectual Properties, Inc., Minneapolis, MN (US)

( * ) Notice: Subject to any disclaimer, the term of this patent is extended or adjusted under 35 U.S.C. 154(b) by 355 days.

(21) Appl. No.: 11/211,805

(22) Filed: Aug. 25, 2005

(65) Prior Publication Data

US 2007/0047856 A1   Mar. 1, 2007

(51) Int. Cl.
*F16C 33/10* (2006.01)

(52) U.S. Cl. ...................... 384/286; 384/290

(58) Field of Classification Search ................. 384/286, 384/289–291, 372, 155, 129, 294, 396, 416, 384/417; 74/559, 569; 123/90.44, 90.33, 123/90.36
See application file for complete search history.

(56) References Cited

U.S. PATENT DOCUMENTS

| | | | |
|---|---|---|---|
| 1,182,492 A | 5/1916 | Knowles | |
| 1,476,334 A | 12/1923 | Halliday | |
| 1,618,125 A | 2/1927 | Harris | |
| 3,321,256 A * | 5/1967 | Orain | 384/447 |
| 3,610,065 A | 10/1971 | Hayashi et al. | |
| 5,259,346 A * | 11/1993 | Mills | 123/90.39 |
| 5,385,408 A * | 1/1995 | Tevaarwerk | 384/115 |
| 5,593,230 A | 1/1997 | Tempest et al. | |
| 5,746,515 A | 5/1998 | Takahashi et al. | |
| 5,758,976 A * | 6/1998 | Lause et al. | 384/129 |
| 5,835,124 A | 11/1998 | Fukita et al. | |
| 5,997,180 A | 12/1999 | Ishizuka et al. | |
| 6,056,442 A * | 5/2000 | Ono et al. | 384/286 |
| 6,280,089 B1 | 8/2001 | Horng | |
| 6,616,338 B2 * | 9/2003 | Tibbits | 384/513 |

FOREIGN PATENT DOCUMENTS

| | | |
|---|---|---|
| DE | 3144720 A1 | 5/1983 |
| JP | 62-106122 | 5/1987 |
| JP | 64-076416 | 3/1989 |

* cited by examiner

*Primary Examiner*—Thomas R Hannon
(74) *Attorney, Agent, or Firm*—Sawyer Law Group LLP

(57) ABSTRACT

A bearing assembly includes a roller bearing having a bore, and a pin positioned within the bore. The pin has a composite outer profile defined by a first substantially circular segment with a first axis of rotation, and a second substantially circular segment with a second axis of rotation of a different radius. The second axis of rotation is offset from the first axis of rotation.

22 Claims, 3 Drawing Sheets

BEARING ASSEMBLY WITH PIN HAVING COMPOSITE CIRCULAR OUTER PROFILE

BACKGROUND OF THE INVENTION

1. Field of the Invention

The present invention relates to bearing assemblies, and, more particularly, to roller bearing assemblies having a pin carrying a roller bearing.

2. Description of the Related Art

A roller bearing assembly typically includes a roller bearing rotatably carried by a pin. Such bearings are suitable in many applications. One such application is for use as part of a cam follower which rides against a cam lobe of a camshaft in an internal combustion (IC) engine. To better distribute mechanical load and provide proper lubrication through the formation of an oil film, it is desirable to maintain a close clearance between the outside diameter of the pin and the bore of the roller bearing. However, to maintain adequate oil flow and because of thermal expansion that occurs after start-up, it is also necessary to provide enough clearance to accommodate such expansion. Conflicting design objectives are thus present.

For certain applications such as the camshaft and cam follower application identified above, loads applied to the pin carrying the roller bearing are primarily of a unidirectional nature. The mechanical load applied to the pin during engine rest squeezes the oil from the area between the pin and inside diameter of the roller bearing. At start-up, the roller bearing must reach a certain rotational speed to establish hydrodynamic lubrication.

What is needed in the art is a roller bearing assembly which accommodates thermal expansion, provides a close clearance between the pin and roller bearing in the area of mechanical loading, and develops an adequate minimum oil film thickness at a lower rotational speed.

SUMMARY OF THE INVENTION

The present invention provides a bearing assembly with a roller bearing carried by a pin having a composite outer profile defined by two overlapped circular segments.

The invention comprises, in one form thereof, a bearing assembly including a roller bearing having a bore, and a pin positioned within the bore. The pin has a composite outer profile defined by a first substantially circular segment with a first axis of rotation, and a second substantially circular segment with a second axis of rotation of a different radius. The second axis of rotation is offset from the first axis of rotation.

The invention comprises, in another form thereof, a cam arrangement including a cam lobe, and a cam follower having a roller bearing assembly biased against the cam lobe. The roller bearing assembly includes a roller bearing with a bore, and a pin positioned within the bore. The pin has a composite outer profile defined by a first substantially circular segment with a first axis of rotation, and a second substantially circular segment with a second axis of rotation. The second axis of rotation is offset from the first axis of rotation.

The invention comprises, in yet another form thereof, a method of manufacturing a bearing assembly, including the steps of: providing a pin for rotatably carrying a roller bearing, the pin having a first diameter and a first axis of rotation; defining a second axis of rotation substantially parallel to and offset from the first axis of rotation; and forming the pin to define a composite outer profile defined by a first substantially circular segment corresponding to the first diameter, and a second substantially circular segment corresponding to a second diameter centered about the second axis of rotation.

An advantage of the present invention is that an adequate minimum oil film thickness between the pin and roller bearing occurs at a lower rotational speed of the roller bearing.

Another advantage is that the oil film pressure is reduced.

A further advantage is that reduced friction and wear occurs at the interface between the pin and roller bearing.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
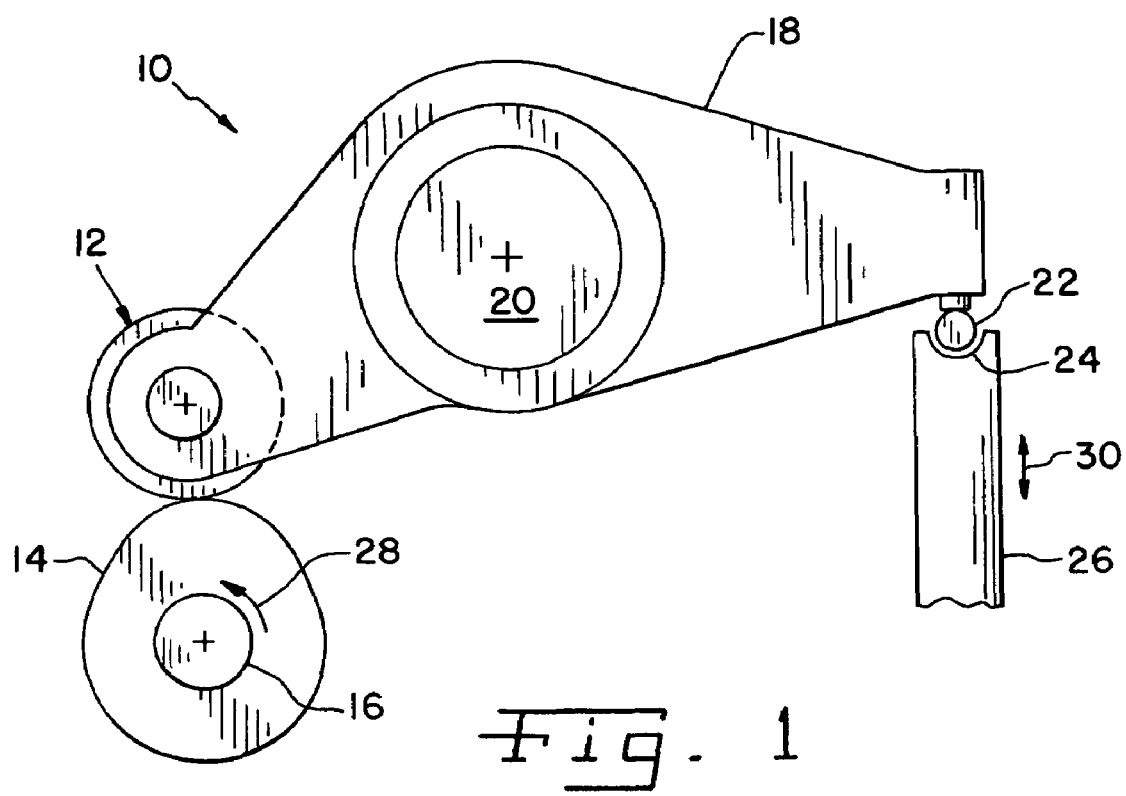
FIG. 1 is a schematic view of a portion of an internal combustion engine, including an embodiment of a bearing assembly of the present invention.

Referring now to the drawings, and more particularly to FIG. 1, there is shown a portion of an IC engine 10 which includes an embodiment of a bearing assembly 12 of the present invention. More particularly, bearing assembly 12 is in the form of a roller bearing assembly which engages a cam lobe 14 on a camshaft 16. Roller bearing assembly 12 is carried by a cam follower 18 which oscillates about a pivot pin 20. Cam follower 18 is in the form of a rocker lever as shown, but may be configured as a different type of cam follower, depending upon the application. At an end of cam follower 18 opposite from roller bearing assembly 12, a ball 22 engages a socket 24 at an end of a push rod 26. During use, rotation of camshaft 16, as indicated by rotational arrow 28, causes oscillating movement of cam follower 18 about pivot pin 20 through the rolling interaction between bearing assembly 12 and cam lobe 14. The oscillating movement of cam follower 18 in turn causes generally reciprocating movement of push rod 26, as indicated by arrow 30.

In the embodiment shown, IC engine 10 is assumed to be a diesel engine, but could also be a different type of combustion engine, such as a gasoline or propane engine. Similarly, camshaft 16 is shown with a single cam lobe 14 for moving cam follower 18 and push rod 26. It will of course be appreciated that an IC engine 10 typically includes a plurality of cam followers and push rods which are actuated by a respective plurality of cam lobes on camshaft 16. Additionally, cam follower 18 is configured as part of an overhead cam system for illustration purposes. It will be appreciated, however, that the size, shape and configuration of the cam system may vary from one application to another.

Figure 2:
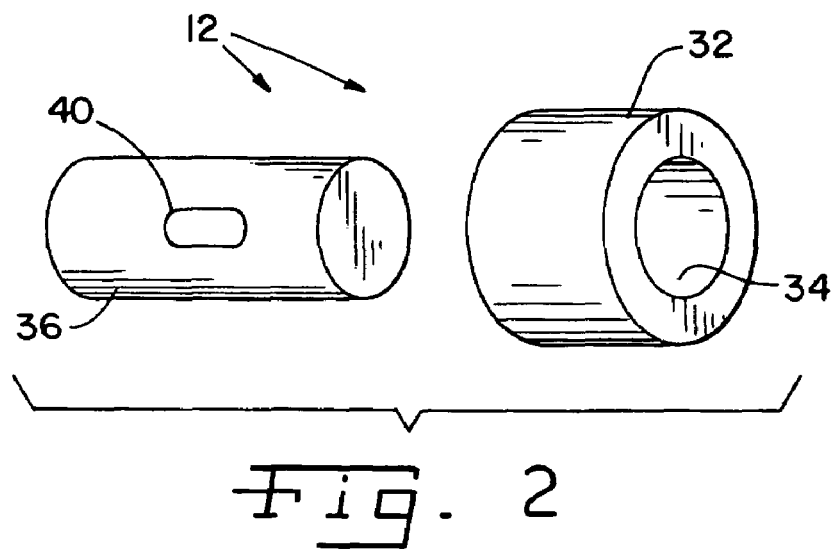
FIG. 2 is an exploded, perspective view of the bearing assembly of FIG. 1.

Referring now to FIG. 2, bearing assembly 12 is shown in greater detail. Bearing assembly 12 includes a roller bearing 32 having a bore 34 with an inside diameter. Roller bearing 32 may be formed from any suitable material such as metal or ceramic, and may include a sleeve adjacent the inside diameter of bore 34.

Bearing assembly 12 also includes a pin 36 which is sized to be received within bore 34 of roller bearing 32. Pin 36 has a composite outer profile with a portion thereof which defines a conformal surface relative to the inside diameter of bore 34. In other words, pin 36 has a composite outer profile with a portion thereof having a diameter which is approximately the same as (only slightly less than) the inside diameter of bore 34.

Figure 3:
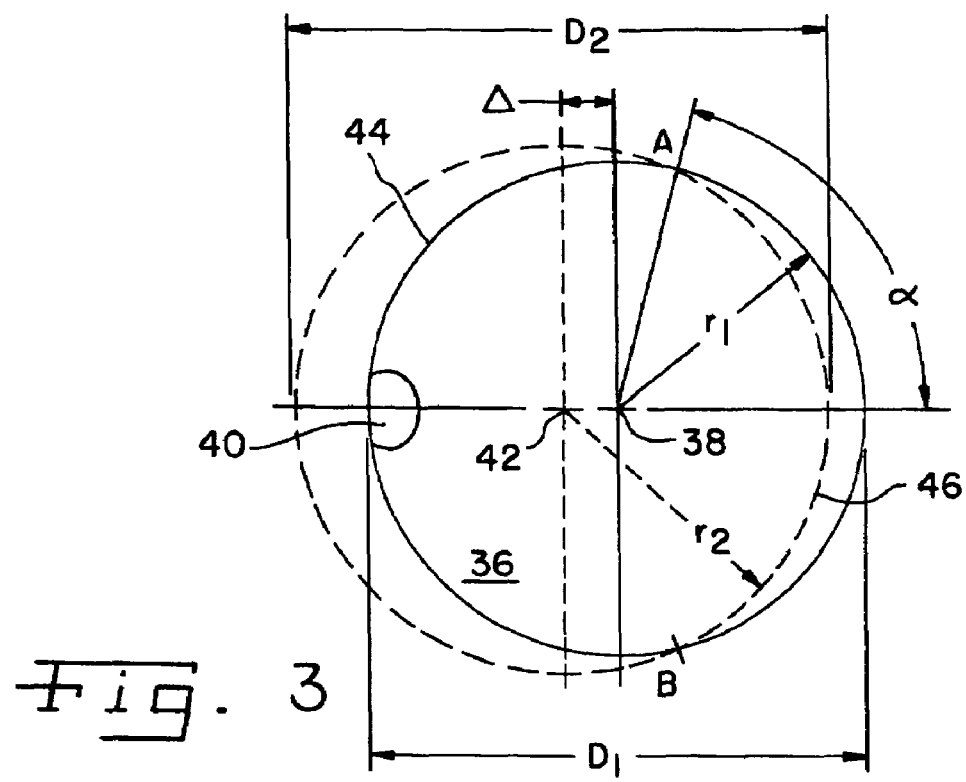
FIG. 3 is a block diagram of the outer profile of the pin forming part of the bearing assembly shown in FIGS. 1 and 2.

Referring now to FIG. 3, the composite outer profile of pin 36 will be described in greater detail. Initially, a pin of cylindrical shape is provided, as represented by the solid circle in FIG. 3. The pin has a first radius r1, a first diameter D1, and a first axis of rotation 38. An oil trough 40 is shown on the left hand side of pin 36, opposite from an area of mechanical loading on the right hand side of pin 36. A portion of the composite outer profile of pin 36 on the side of mechanical loading is modified according to an offset circular profile.

More particularly, a circular profile represented by a dashed line and having a second radius r2, second diameter D2 and second axis of rotation 42 is overlayed relative to the cross-section of pin 36. Second axis of rotation 42 is parallel to but offset from first axis of rotation 38 on a side opposite from the area of mechanical loading on pin 36. The composite outer profile of pin 36 is defined by a first substantially circular segment 44 shown by the solid line extending from the left of intersection points A and B, and a second substantially circular segment 46 shown by the dotted line extending to the right of intersection points A and B. Second substantially circular segment 46 has a second radius r2 (corresponding to the second diameter D2 of the overlayed circle) which is larger than the first radius r1. The second radius r2 is just slightly less than the inside radius of bore 34 of roller bearing 32.

The circular profile originating from second axis of rotation 42 which is overlayed on the cross-section of pin 36 defines intersection points A and B with the original circular profile of pin 36. The offset between first axis of rotation 38 and second axis of rotation 42 can be shifted left or right as desired, and thus shifting intersection points A and B. Based upon the substantially unidirectional but slightly varying mechanical loads which are exerted against the right hand side of pin 36 by cam lobe 14, intersection points A and B may range through an angular arc $\alpha$ of between approximately 40° to 60°, as measured from first axis of rotation 38. Intersection points A and B define a respective pair of intersection lines between first substantially circular segment 44 and second substantially circular segment 46 which extend along the length of pin 36 (i.e., perpendicular to the drawing of FIG. 3).

In the embodiment shown, pin 36 has a first diameter D1 of 22.86±0.005 mm, and a second diameter D2 of 22.92±0.0025 mm. The offset $\Delta$ between first axis of rotation 38 and second axis of rotation 42 is 0.043 mm. Of course, these dimensions may vary, depending upon the specific application.

Figure 4:
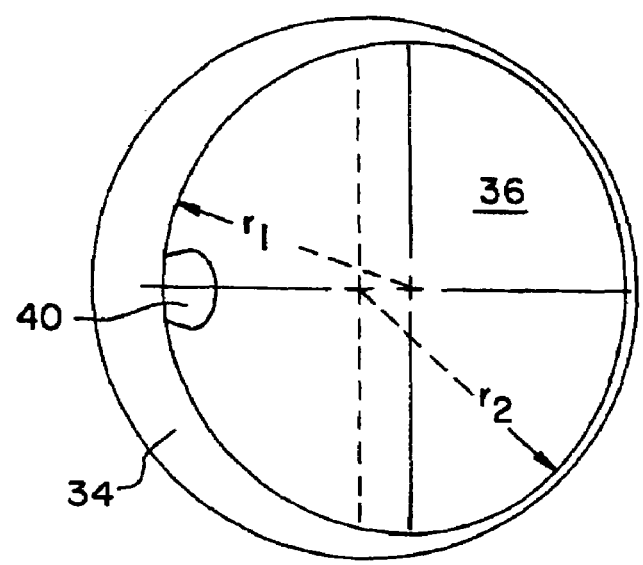
FIG. 4 is diagrammatic end view of the pin positioned within the bore of the roller bearing, when in a loaded state.

FIG. 4 illustrates pin 36 shown in FIGS. 2 and 3 installed within bore 34, when in a loaded state applied from the right side. Pin 36 has an outside diameter corresponding to radius r2 which is just slightly less than the inside diameter of bore 34 on the right side. This creates a small hydrodynamic clearance which allows an oil film thickness to be quickly established after start-up and results in better load distribution and less wear to pin 36. On the other hand, pin 36 has a smaller outside diameter corresponding to radius r1 which results in a larger gap between pin 36 and the inside diameter of bore 34 on the side away from mechanical loading which provides clearance for oil flow and a space to accommodate thermal expansion. For the configuration shown in FIGS. 3 and 4, an adequate minimum oil film thickness of 0.5 microns can be created at a rotational speed of approximately 250 RPM, compared with a required rotational speed of approximately 750 RPM when using a conventional cylindrical pin.

Figure 5:
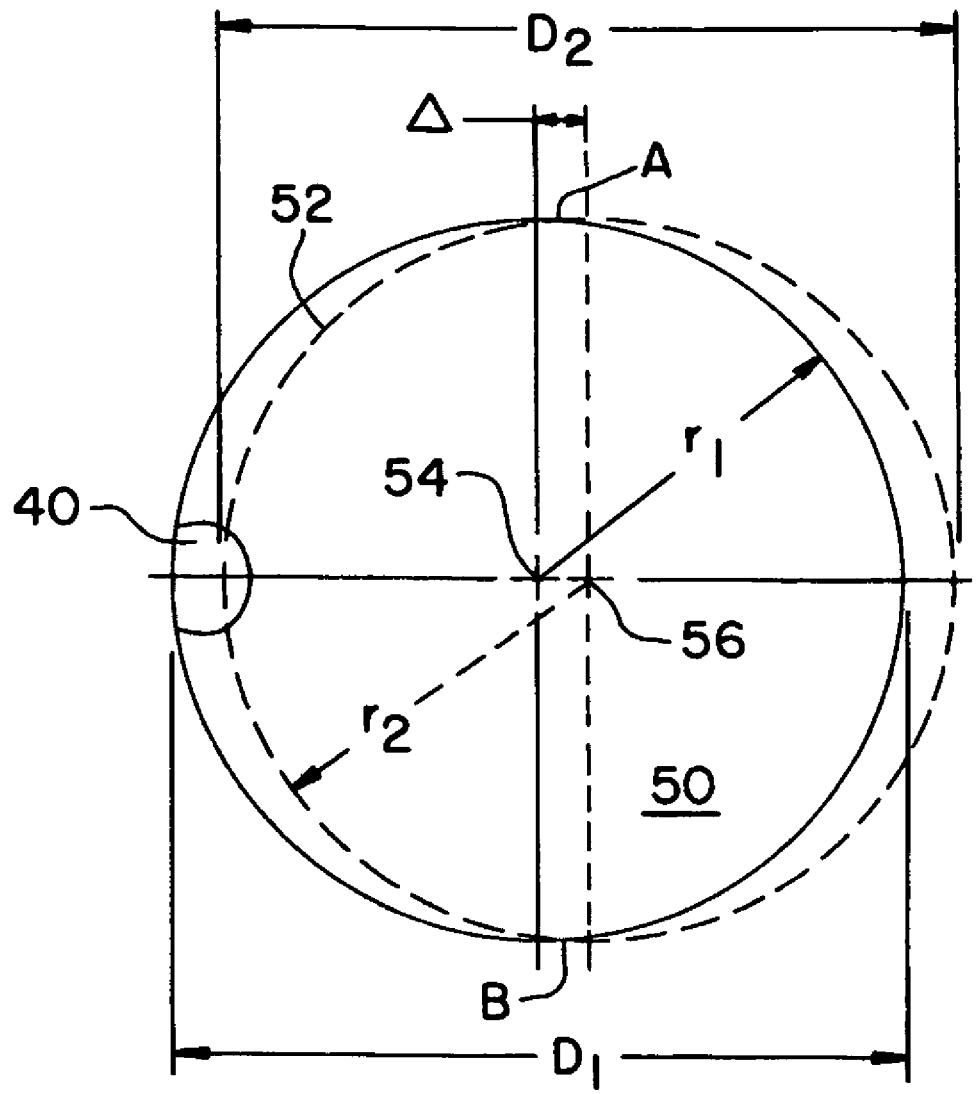
FIG. 5 is a block diagram of the outer profile of another embodiment of a pin forming part of a bearing assembly of the present invention.

Referring now to FIG. 5, there is shown an outer profile of another embodiment of a pin 50 of the present invention for use in a roller bearing assembly. In contrast with the embodiment of pin 36 shown in FIGS. 3 and 4, pin 50 is overlayed with an offset circular profile which is approximately the same diameter as the original geometry of pin 50. The original geometry of pin 50 is shown by the solid line in FIG. 5, and the overlayed circular profile is shown by the dashed line in FIG. 5. A second substantially circular segment 52 extending from the left of intersection points A and B represents the modified circular profile of pin 50 which will be positioned at the side opposite to the mechanical loading side of pin 50. The original geometry of pin 50 extending from the right of intersection points A and B has a diameter which is just slightly less than the inside diameter of bore 34. Pin 50 may be smoothened along the intersection lines at points A and B.

In the embodiment shown, pin 50 has a first diameter D1 and a second diameter D2 which are each 22.901±0.005 mm, as measured from first axis of rotation 54 and second axis of rotation 56, respectively. Pin 50 also has an offset $\Delta$ of 0.034±0.005 mm between first axis of rotation 54 and second axis of rotation 56.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A bearing assembly, comprising:
   a roller bearing including a bore; and
   a pin positioned within said bore, said pin having a composite outer profile defined by a first substantially circular segment with a first axis of rotation, and a second substantially circular segment with a second axis of rotation, said second axis of rotation being offset from said first axis of rotation, wherein the pin has a first outside diameter corresponding to a first radius on a side of the pin that is slightly less than the inside diameter of the bore to create a small high dynamic clearance which allows oil film thickness to be established and the pin has a second outside diameter that is smaller than the first outside diameter corresponding to a second radius which results in a larger gap between the pin and the bore on a side away from mechanical loading which provides clearance for oil flow and a space to accommodate thermal expansion.

2. The bearing assembly of claim 1, wherein said second axis of rotation is substantially parallel to said first axis of rotation.

3. The bearing assembly of claim 1, wherein said first substantially circular segment and said second substantially circular segment overlap along a pair of intersection lines.

4. The bearing assembly of claim 3, wherein said first axis of rotation and said second axis of rotation define a plane, said pair of intersection lines being offset from said plane through an angular arc not exceeding ±60°.

5. The bearing assembly of claim 4, wherein said pair of intersection lines are offset from said plane through an angular arc between approximately 40° to 60°.

6. The bearing assembly of claim 4, wherein said angular arc is measured from said first axis of rotation.

7. The bearing assembly of claim 3, wherein said pair of intersection lines are smoothened.

8. The bearing assembly of claim 1, wherein said first substantially circular segment and said second substantially circular segment overlap along a pair of intersection lines, said second substantially circular segment defining a conformal surface which conforms to an inside diameter of said bore.

9. The bearing assembly of claim 8, wherein said first substantially circular segment defines a non-conformal surface with respect to said inside diameter of said bore.

10. A cam arrangement, comprising;
   a cam lobe; and
   a cam follower including a roller bearing assembly biased against said cam lobe, said roller bearing assembly including a roller bearing with a bore, and a pin positioned within said bore, said pin having a composite outer profile defined by a first substantially circular segment with a first axis of rotation, and a second substantially circular segment with a second axis of rotation, said second axis of rotation being offset from said first axis of rotation, wherein the pin has a first outside diameter corresponding to a first radius on a side of the pin that is slightly less than the inside diameter of the bore to create a small high dynamic clearance which allows oil film thickness to be established and the pin has a second outside diameter that is smaller than the first outside diameter corresponding to a second radius which results in a larger gap between the pin and the bore on a side away from mechanical loading which provides clearance for oil flow and a space to accommodate thermal expansion.

11. The cam arrangement of claim 10, wherein said cam lobe comprises a cam lobe on a camshaft of an internal combustion engine.

12. The cam arrangement of claim 10, wherein said second axis of rotation is substantially parallel to said first axis of rotation.

13. The cam arrangement of claim 10, wherein said first substantially circular segment and said second substantially circular segment overlap along a pair of intersection lines.

14. The cam arrangement of claim 13, wherein said first axis of rotation and said second axis of rotation define a plane, said pair of intersection lines being offset from said plane through an angular arc not exceeding ±60°.

15. The cam arrangement of claim 14, wherein said pair of intersection lines are offset from said plane through an angular arc between approximately 40° to 60°.

16. The cam arrangement of claim 14, wherein said angular arc is measured from said first axis of rotation.

17. The cam arrangement of claim 13, wherein said pair of intersection lines are smoothened.

18. The cam arrangement of claim 10, wherein said first substantially circular segment and said second substantially circular segment overlap along a pair of intersection lines, said second substantially circular segment defining a conformal surface which conforms to an inside diameter of said bore.

19. The cam arrangement of claim 18, wherein said first substantially circular segment defines a less-conformal surface with respect to said inside diameter of said bore.

20. A method of manufacturing a bearing assembly, comprising the steps of: providing a pin for rotatably carrying a roller bearing, said pin having a first diameter and a first axis of rotation;
   defining a second axis of rotation substantially parallel to and offset from said first axis of rotation; and
   forming said pin to define a composite outer profile defined by a first substantially circular segment corresponding to said first diameter, and a second substantially circular segment corresponding to a second diameter centered about said second axis of rotation, wherein the pin has a first outside diameter corresponding to a first radius on a side of the pin that is slightly less than the inside diameter of the bore to create a small high dynamic clearance which allows oil film thickness to be established and the pin has a second outside diameter that is smaller than the first outside diameter corresponding to a second radius which results in a larger gap between the pin and the bore on a side away from mechanical loading which provides clearance for oil flow and a space to accommodate thermal expansion.

21. The method of manufacturing a bearing assembly of claim 20, including the step of positioning said pin within a bore of the roller bearing, said second diameter corresponding to an inside diameter of said bore.

22. The method of manufacturing a bearing assembly of claim 20, wherein said forming step comprises one of machining, forging and stamping.

* * * * *